(12) United States Patent
Inoue

(10) Patent No.: US 9,447,886 B2
(45) Date of Patent: Sep. 20, 2016

(54) SEALING DEVICE

(75) Inventor: Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/006,670

(22) PCT Filed: Mar. 9, 2012

(86) PCT No.: PCT/JP2012/056059
§ 371 (c)(1),
(2), (4) Date: Sep. 21, 2013

(87) PCT Pub. No.: WO2012/128062
PCT Pub. Date: Sep. 27, 2012

(65) Prior Publication Data
US 2014/0008872 A1 Jan. 9, 2014

(30) Foreign Application Priority Data

Mar. 23, 2011 (JP) .................................. 2011-063471

(51) Int. Cl.
*F01D 11/02* (2006.01)
*F16J 15/44* (2006.01)

(52) U.S. Cl.
CPC .................................... *F16J 15/441* (2013.01)

(58) Field of Classification Search
CPC .... F16J 15/441; F16J 15/442; F16J 15/3288; F01D 11/02
USPC .......................... 277/409, 411, 418, 421, 422
See application file for complete search history.

(56) References Cited

U.S. PATENT DOCUMENTS 2,908,516 A * 10/1959 Stein ............................. 277/548
3,785,660 A * 1/1974 Bush ............................. 277/559

(Continued)

FOREIGN PATENT DOCUMENTS

| JP | S55-027553 A | 2/1980 |
| JP | S56101459 A | 8/1981 |

(Continued)

OTHER PUBLICATIONS

International Search Report (ISR) mailed Apr. 10, 2012, issued for International application No. PCT/JP2012/056059.

(Continued)

*Primary Examiner* — Gilbert Lee
*Assistant Examiner* — Nathan Cumar
(74) *Attorney, Agent, or Firm* — Law Office of Katsuhiro Arai

(57) ABSTRACT

A sealing device is provided with a floating ring between an outer periphery of a rotating shaft and an inner periphery of a casing and is characterized in that a turn-stopping means is provided to a single point in a circumferential direction of the floating ring, and a groove for generating dynamic pressure is provided in unequal distribution in the circumferential direction to an inner peripheral surface of the floating ring, wherein a dynamic pressure is generated by a dynamic pressure groove provided to the inner peripheral surface of the floating ring and is employed to thereby match together the center of the rotating shaft and the floating ring.

4 Claims, 8 Drawing Sheets

(56) References Cited

U.S. PATENT DOCUMENTS

| | | | |
|---|---|---|---|
| 4,175,755 A | 11/1979 | Geary | |
| 4,275,891 A * | 6/1981 | Boes | 277/400 |
| 4,348,029 A * | 9/1982 | Oishi | F16J 15/441 277/422 |
| 6,142,478 A * | 11/2000 | Pecht | F16J 15/3484 277/400 |
| 2009/0194950 A1* | 8/2009 | Orlowski et al. | 277/413 |
| 2012/0261887 A1* | 10/2012 | Vasagar | 277/543 |

FOREIGN PATENT DOCUMENTS

| | | | |
|---|---|---|---|
| JP | 59058272 | * | 4/1984 |
| JP | S59-058272 A | | 4/1984 |
| JP | S63-149481 A | | 6/1988 |
| JP | H10-299905 A | | 11/1998 |
| JP | 2003 097730 | * | 3/2003 |
| JP | 2003 097730 | * | 4/2003 |
| JP | 2003-097730 A | | 4/2003 |

OTHER PUBLICATIONS

Notification of Transmittal of Translation of the International Preliminary Report on Patentability (PCT/IB/338) mailed Oct. 3, 2013, with International Preliminary Report on Patentability (PCT/IB/373) and Written Opinion of the International Searching Authority (PCT/ISA/237), for corresponding international application PCT/JP2012/056059.

First Notification of Reasons for Refusal with Search Report issued on Dec. 2, 2014 by the State Intellectual Property Office of China for Chinese counterpart application No. 201280012441.2.

Second Notification of Reason for Refusal with Search Report issued on Aug. 31, 2015 by the State Intellectual Property Office of China for Chinese counterpart application No. 201280012441.2.

A Notification of Reasons for Refusal issued by the Japanese Patent Office, mailed Jan. 26, 2016, for Japanese counterpart application No. 2013-505881.

* cited by examiner

SEALING DEVICE

This application is the U.S. National Phase under 35 U.S.C. §371 of International Application PCT/JP2012/056059, filed Mar. 9, 2012, which claims priority to Japanese Patent Application No. 2011-063471, filed Mar. 23, 2011. The International Application was published under PCT Article 21(2) in a language other than English.

TECHNICAL FIELD

The present invention relates to a sealing device to be used in a rotating shaft; more specifically, the present invention relates to a sealing device provided with a floating ring to be used in a rotating shaft of a pump or the like.

BACKGROUND ART

One example of a known conventional sealing device provided with a floating ring is illustrated in FIG. 6 (hereinafter referred to as the first prior art; for example, see Patent Document 1). In the first prior art, a floating ring 30 has a low-pressure-side surface which is in contact with an engaging ring 32 provided to a casing and to which is provided a pressure balance groove 33 for guiding a high-pressure fluid, the pressure balance groove being constituted of at least one circumferential groove as well as a plurality of rectilinear grooves extending in an outer peripheral direction from the circumferential groove. A wedging effect is thereby generated at a small portion in a gap formed between a rotating shaft 31 and an inner peripheral surface of the floating ring 30 (the effect of dynamic pressure generated at a wedge part), and the wedging effect is employed to fully bring about a self-aligning action aimed at maintaining a uniform gap between the rotating shaft 31 and the inner peripheral surface of the floating ring 30, as well as to: hinder any deformation of the floating ring 30; keep constant the gap between the rotating shaft 31 and the inner peripheral surface of the floating ring 30; prevent damage to the floating ring 30, caused by there being contact between the inner peripheral surface of the floating ring 30 and the rotating shaft 31 in motion; and prevent any increase in the amount of high-pressure fluid leaking out to the low-pressure side and/or prevent the equipment from discontinuing operation.

A different example of another known conventional sealing device provided with a floating ring is illustrated in FIG. 7 (hereinafter referred to as the second prior art; for example, see Patent Document 2). In the second prior art, interconnecting parts 36 oriented radially outward are provided to an outer periphery of a floating ring 35 formed in an annular shape; the interconnecting parts 36 are provided as a pair at 180° intervals in the circumferential direction and are inserted into a groove part 38 of a casing 37, thus supporting the floating ring 35 in a manner concentric with a rotating shaft 39.

However, in the sealing device provided with the floating ring in the first prior art illustrated in FIG. 6, although an advantage is presented in that the self-aligning action aimed at keeping uniform the gap formed between the rotating shaft 31 and the inner peripheral surface of the floating ring 30 is brought about, no turn-stopping means is provided for the floating ring 30, and therefore in a case such as where the rotational speed of the rotating shaft 31 becomes higher, a problem has been presented in that the influence of a viscous fluid interposed in the gap between the floating ring 30 and the rotational shaft 31 causes the floating ring 30 to rotate, and causes the behavior of the floating ring 30 to become unstable. Further, in the sealing device provided with the floating ring in the first prior art, in a case where the dynamic pressure generated at the small portion in the gap between the rotating shaft 31 and the inner peripheral surface of the floating ring 30 is less than the weight of the floating ring 30, then operation will thus take place in a state where the gap formed between the rotating shaft 31 and the inner peripheral surface of the floating ring 30 ceases to be uniform and becomes eccentric.

In the sealing device provided with the floating ring in the second prior art illustrated in FIG. 7, the floating ring 35 will not rotate, because the pair of interconnecting parts 36 provided at a 180° interval in the circumferential direction are inserted into the groove part 38 of the casing 37. However, in practice, it is difficult to assemble the floating ring 35 to be concentric with the rotating shaft 39, and therefore a problem is presented in that the floating ring 35 is assembled in an eccentric state relative to the rotating shaft 39. An additional problem has been presented in that the floating ring 35 is unable to flexibly track the eccentricity of the rotating shaft 39 caused by the deflection of the rotating shaft 39 or a similar factor.

CITATION LIST

Patent Literature

Patent Document 1: Japanese Laid-open Patent Publication No. 10-299905
Patent Document 2: Japanese Laid-open Patent Publication No. 2003-97730

SUMMARY OF INVENTION

Technical Problem

In a case where it is not possible to match the center of the rotating shaft and the center of the floating ring, as in the first prior art and the second prior art described above, it is necessary to set the gap therebetween to be large, in order to prevent contact between the floating ring and the rotating shaft. As a result, a problem has been presented in that there has been a large amount of sealing fluid leaking, proportional to the cube of the gap.

An objective of the present invention is to provide a sealing device provided with a floating ring, wherein a dynamic pressure for preventing the floating ring from rotating, the dynamic pressure being generated by a dynamic pressure groove provided to an inner peripheral surface of the floating ring, is employed to thereby make it possible to match together the center of the rotating shaft and the center the floating ring, even in a case where the weight of the floating ring and the force lifting up the floating ring imparted by the wedging effect between the rotating shaft and the floating ring are not matched.

Solution to Problem

In a first aspect of the present invention intended to achieve the foregoing objective, a sealing device provided with a floating ring between an outer periphery of a rotating shaft and an inner periphery of a casing is characterized in that a turn-stopping means is provided to a single point in a circumferential direction of the floating ring, and a groove for generating dynamic pressure is provided in unequal distribution in the circumferential direction to an inner peripheral surface of the floating ring.

A second aspect of the present invention relates to the sealing device of the first aspect, wherein the sealing device is characterized in that the turn-stopping means is provided to positions within a second quadrant and a third quadrant and the groove for generating dynamic pressure is provided to a position in a first quadrant, or to positions in a first quadrant and the second quadrant, of the inner peripheral surface of the floating ring, when a direction of rotation of the rotating shaft is in a counterclockwise direction, in a coordinate system in which an origin of the X-Y coordinate axes is placed at the center of the rotating shaft when the rotating shaft is seen from one side, in a case where there exists a relationship such that the weight of the floating ring is greater than the force for lifting up the floating ring by the wedging effect between the rotating shaft and the floating ring.

A third aspect of the present invention relates to the sealing device of the first aspect, wherein the sealing device is characterized in that the turn-stopping means is provided to positions within a second quadrant and a third quadrant and the groove for generating dynamic pressure is provided to a position in a fourth quadrant, or to positions in the third quadrant and a fourth quadrant, of the inner peripheral surface of the floating ring, when a direction of rotation of the rotating shaft is in a counterclockwise direction, in a coordinate system in which an origin of X-Y coordinate axes is placed at the center of the rotating shaft when the rotating shaft is seen from one side, in a case where there exists a relationship such that the weight of the floating ring is less than the force for lifting up the floating ring by the wedging effect between the rotating shaft and the floating ring.

Advantageous Effects of Invention

The present invention exhibits the following superior effects.

(1) In a sealing device provided with a floating ring, a dynamic pressure for preventing the floating ring from rotating during the rotation of the rotating shaft, the dynamic pressure being generated by a dynamic pressure groove provided to an inner peripheral surface of the floating ring, is employed to thereby make it possible to match together the center of the rotating shaft and the center of the floating ring, even in a case where the weight of the floating ring and the force lifting up the floating ring imparted by the wedging effect between the rotating shaft and the floating ring are not matched.

(2) Because the center of the rotating shaft and the center of the floating ring can be matched together during the rotation of the rotating shaft, the gap between the inner peripheral surface of the floating ring and the outer peripheral surface of the rotating shaft can be set to be smaller, and the sealing performance of the sealing device can be enhanced. The fluid film thickness can be increased in a balanced manner, and therefore it is possible to reduce the risk of contact between the inner peripheral surface of the floating ring and the outer peripheral surface of the rotating shaft.

DESCRIPTION OF EMBODIMENTS

Modes for carrying out the sealing device according to the present invention shall now be described in detail, with reference to the accompanying drawings, but are not intended to be construed as limiting the present invention. Provided that there is no departure from the scope of the present invention, a variety of changes, modifications, or improvements are included on the basis of the knowledge of a person skilled in the art.

Figure 1:
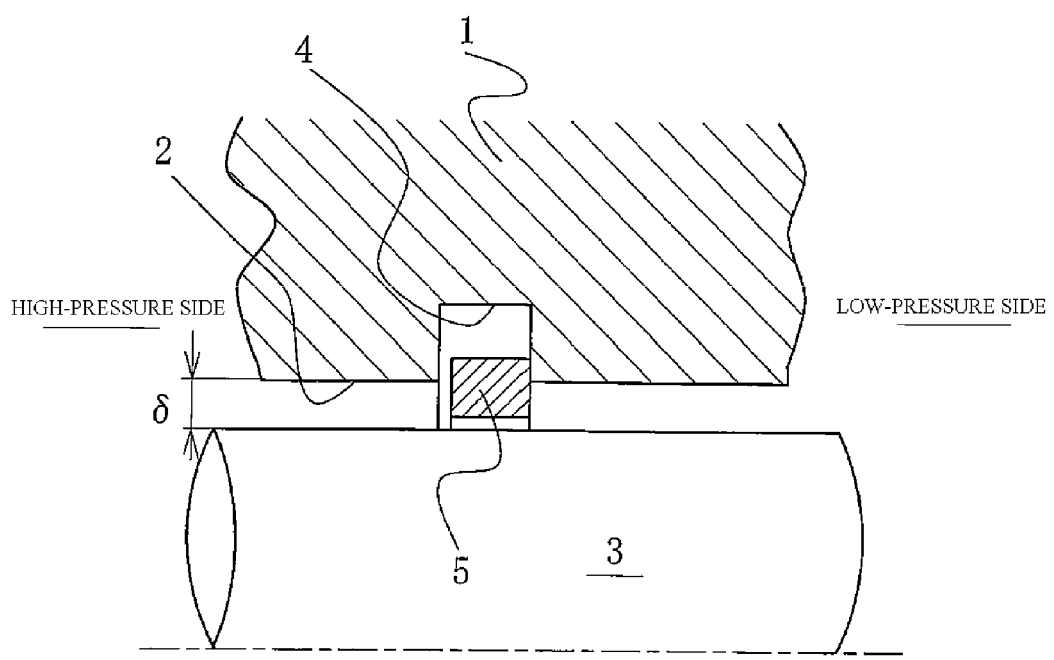
FIG. 1 is a front cross-sectional view schematically illustrating a sealing device according to an embodiment of the present invention, and illustrates a state where a floating ring has been lifted upward by the rotation of a rotating shaft.

FIG. 1 is a front cross-sectional view schematically illustrating a sealing device according to an embodiment of the present invention, and illustrates a state where a floating ring has been lifted upward by the rotation of a rotating shaft.

In FIG. 1, a rotating shaft 3 of a pump or the like is installed so as to penetrate into a hole 2 of a casing 1; the left side is a high-pressure side and the right side is a low-pressure side. A gap δ in a radial direction is provided between an inner peripheral surface of the casing 1 and an outer peripheral surface of the rotating shaft 3, and a hollow, cylindrical floating ring 5 is provided so as to surround the outer periphery of the rotating shaft 3 in order to seal this gap δ. A cylindrical space 4 for accommodating the floating ring 5 is provided inside the casing 1. The diameter and width of the space 4 are greater than the outer diameter and width of the floating ring 5. The inner diameter of the floating ring 5 is also set to be slightly larger than the outer diameter of the rotating shaft 3, and the floating ring 5 is able to move in the radial direction within a constant range.

Figure 2:
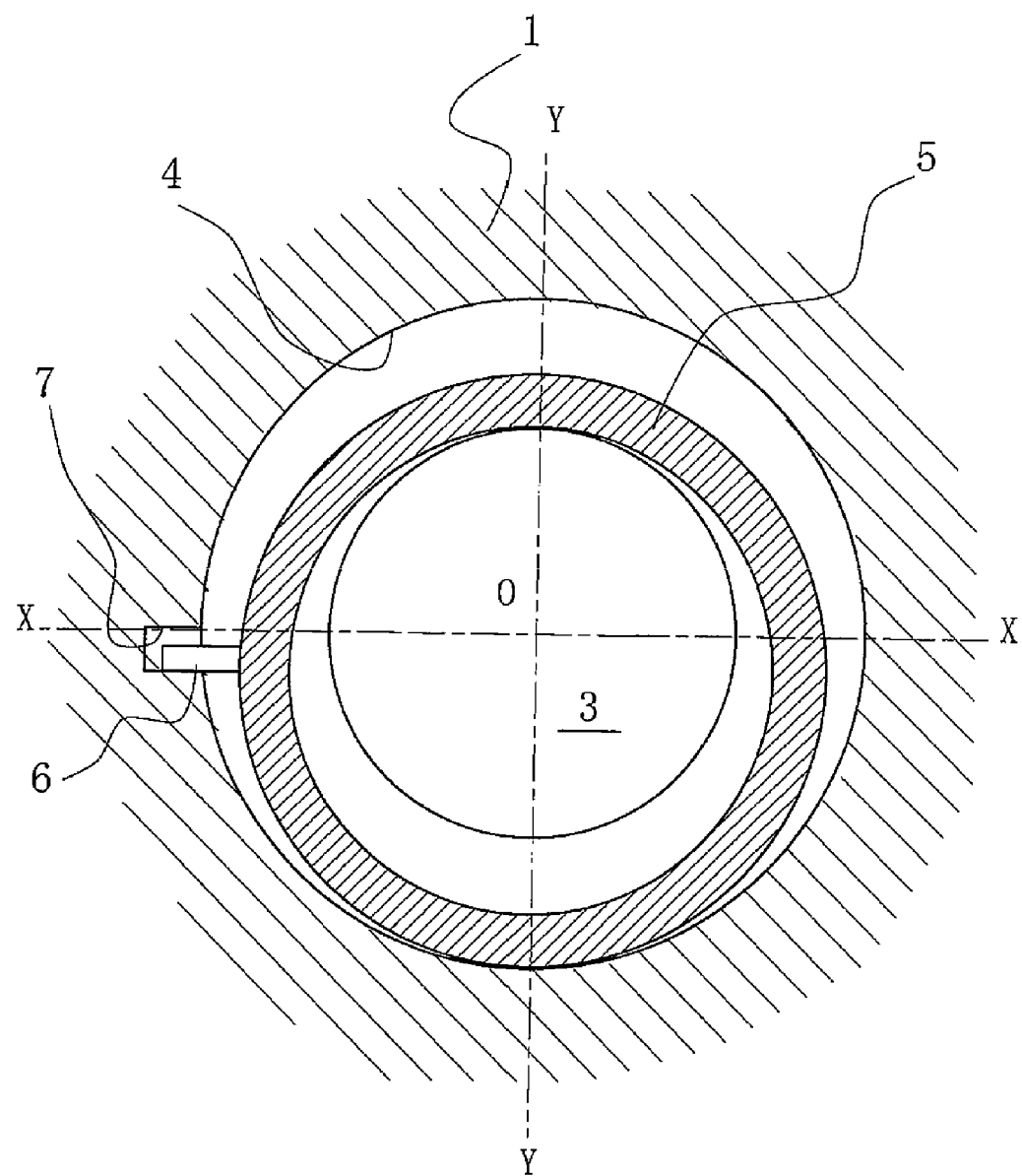
FIG. 2 is a side view schematically illustrating the sealing device according to the embodiment of the present invention, and illustrates a state where the rotating shaft is stationary.

FIG. 2 is a side view schematically illustrating the sealing device according to the embodiment of the present invention, and illustrates a state where the rotating shaft is stationary.

In FIG. 2, a turn-stopping pin 6 is provided to a left-side surface of the outer peripheral surface of the floating ring 5 so as to protrude radially outward, and the turn-stopping pin 6 is loosely fitted into a groove 7 provided radially outward from the cylindrical space 4 of the casing 1, thus preventing rotation of the floating ring 5. The turn-stopping pin 6 is provided at one point in the circumferential direction of the floating ring 5. The location of the pin may be positioned in a second quadrant and a third quadrant in an X-Y coordinate system, the origin of which is a center O of the rotating shaft 3 when the direction of rotation of the rotating shaft 3 is in the counterclockwise direction. However, there is no particular limitation to the location shown in FIG. 2. Further, the turn-stopping means is not limited to being a pin, so long as the turn-stopping means has a function for engaging with the casing 1 and preventing the rotation of the floating ring 5.

Figure 3:
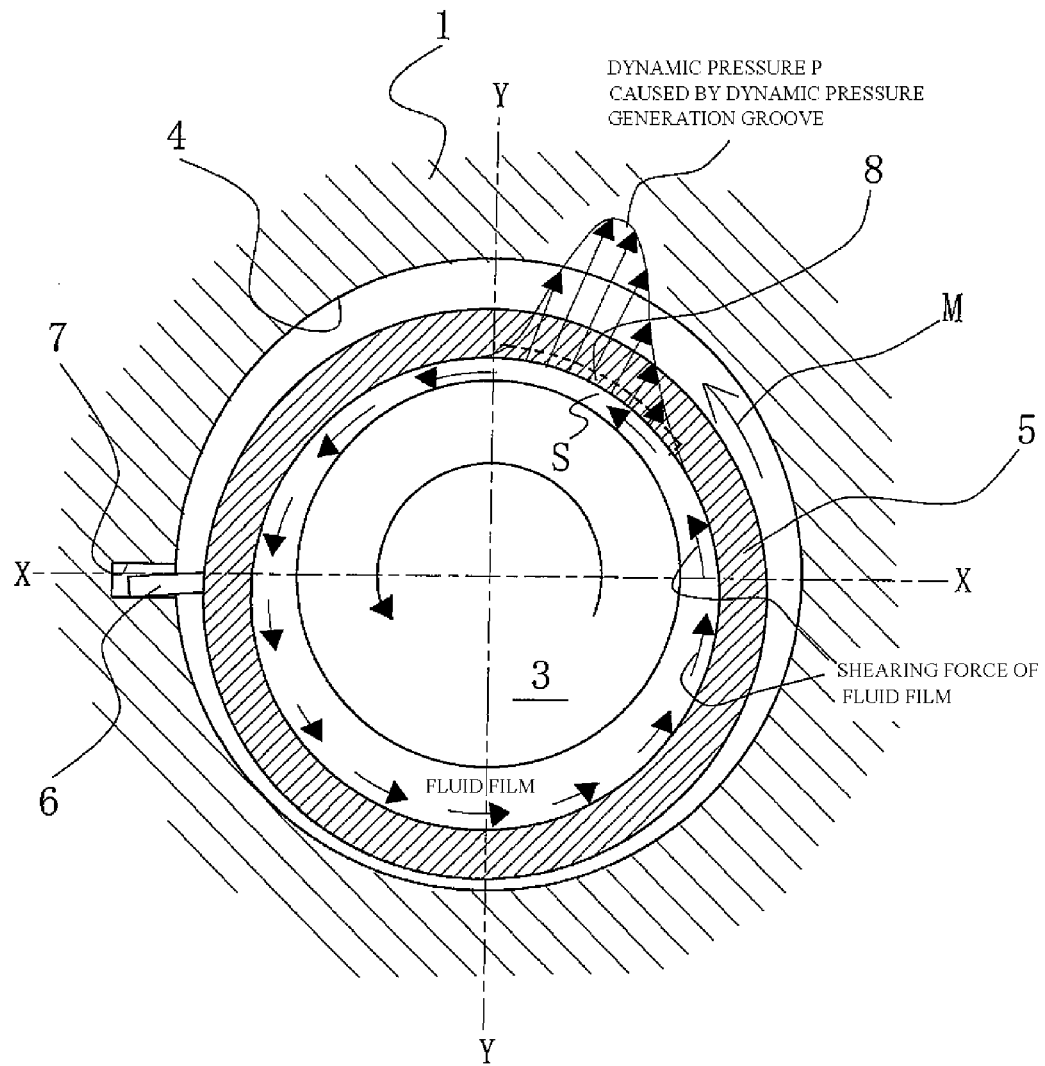
FIG. 3 is a side view schematically illustrating the sealing device according to the embodiment of the present invention, and illustrates a state where the rotating shaft has begun to rotate.

FIG. 3 is a side view schematically illustrating the sealing device according to the embodiment of the present invention, and illustrates a state where the rotating shaft has begun to rotate.

At such a time, when the rotating shaft 3 begins to rotate in the counterclockwise direction, a wedging effect in a gap S for sealing fluid generates a force for lifting up the floating ring 5, the gap being interposed between the rotating shaft 3 and the floating ring 5. In a case where there exists a relationship such that the weight of the floating ring is greater than the force for lifting up the floating ring 5 by the wedging effect between the rotating shaft 3 and the floating ring 5, the center of the floating ring 5 is lower than the center of the rotating shaft 3. In such a state, there will be localized thinning of the fluid film interposed between the outer periphery of the rotational shaft and the inner periphery of the floating ring, and therefore there is a risk of contact between the inner peripheral surface of the floating ring 5 and the outer peripheral surface of the rotating shaft 3 when the behavior of the rotating shaft 3 becomes unstable, such as in the case of abnormal vibrations.

In order to avoid such a risk, it is necessary for the gap between the inner peripheral surface of the floating ring 5 and the outer peripheral surface of the rotating shaft 3 to be set so as to be larger. However, when the gap is made larger, the amount of fluid to be sealed that leaks out from the gap increases in proportion to the cube of the gap.

In the present invention, in order for the center of the floating ring 5 and the center of the rotating shaft 3 to be matched together as much as possible during the rotation of the rotating shaft 3, a dynamic pressure groove 8 for generating dynamic pressure is provided in unequal distribution in the circumferential direction.

For example, in the illustration in FIG. 3, the dynamic pressure groove 8 for generating dynamic pressure is provided to a position in a first quadrant, or to positions in the first quadrant and a second quadrant, of the inner peripheral surface of the floating ring 5 in a coordinate system in which the origin of the X-Y coordinate axes is placed at the center of the rotating shaft 3 in a case where there exists a relationship such that the weight of the floating ring is greater than the force for lifting up the floating ring by the wedging effect between the rotating shaft and the floating ring and where the direction of rotation of the rotating shaft 3 is the counterclockwise direction.

In the present invention, the fact that the dynamic pressure groove is provided in unequal distribution in the circumferential direction signifies that, rather than the dynamic pressure groove being installed equally in the circumferential direction, the dynamic pressure groove is instead provided in a localized manner, as illustrated in FIG. 3. This also signifies that the dynamic pressure groove is provided either so as to be absent in a local manner or such that the groove depth is changed in a local manner.

When a dynamic pressure p as illustrated in FIG. 3 is generated by the dynamic pressure groove 8, a moment of rotation M pivoting on the turn-stopping pin 6 is generated by the floating ring 5, and the floating ring 5 moves upward as a whole, pivoting about the turn-stopping pin 6.

Figure 4:
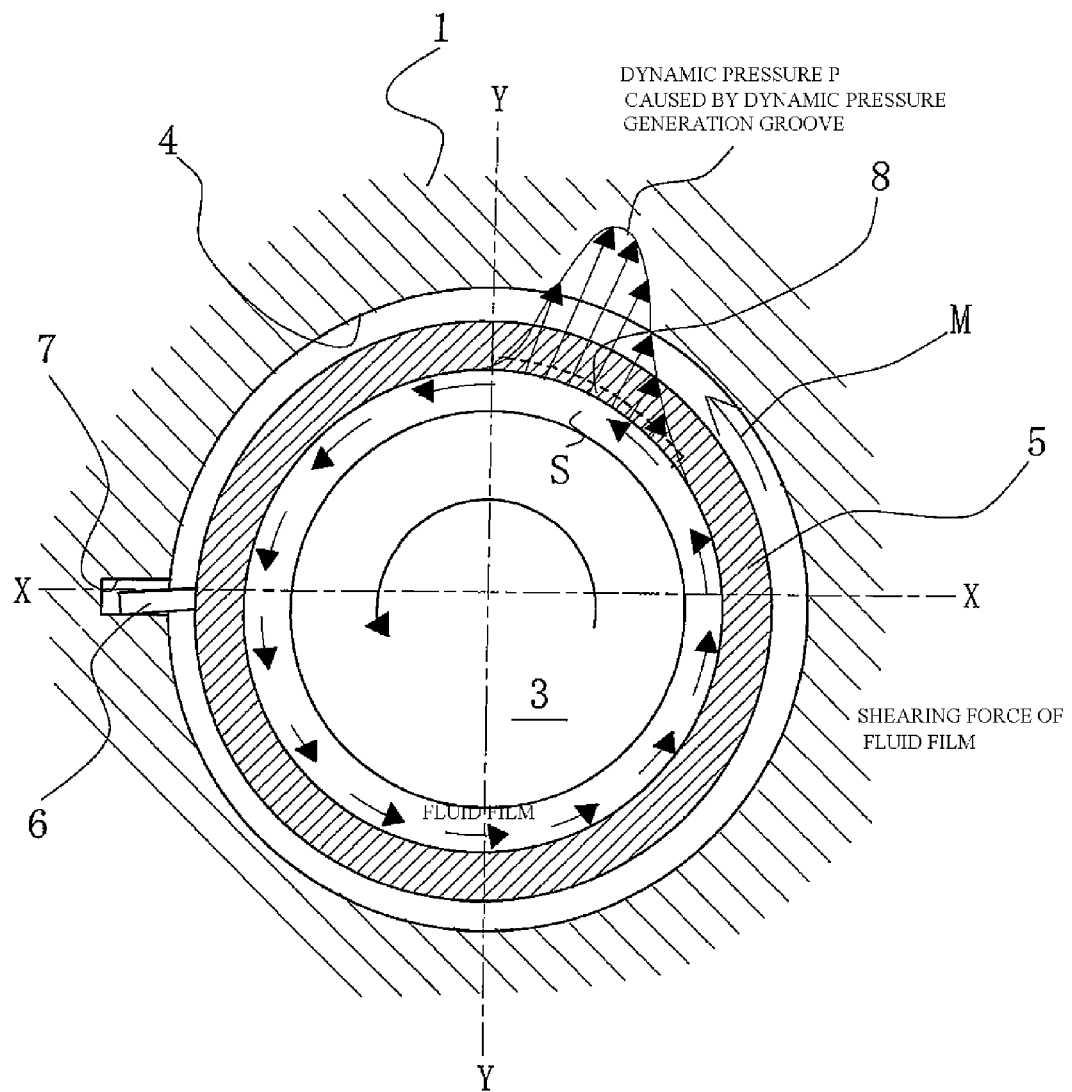
FIG. 4 is a side view schematically illustrating the sealing device according to the embodiment of the present invention, and illustrates a state where the rotating shaft has reached a predetermined rotational speed.

Herein, where the weight of the floating ring 5 is W, the force lifting up the floating ring 5 by the wedging effect in the gap S between the rotating shaft 3 and the floating ring 5 is F1, the force lifting up the floating ring 5 by the dynamic pressure p generated in the dynamic pressure groove 8 is F2, and the distance in the X direction from the turn-stopping pin 6 at each of the points of action is L1, L2, and L3, respectively. In this case, the center of the floating ring 5 and the center of the rotating shaft 3 are matched together when the force F2 imparted by the dynamic pressure p generated in the dynamic pressure groove 8 is set such that $W \cdot L1 = F1 \cdot L2 + F2 \cdot L3$, as illustrated in FIG. 4. As such, the gap between the inner peripheral surface of the floating ring 5 and the outer peripheral surface of the rotating shaft 3 can be set to be smaller, and the sealing performance of the sealing device can be enhanced. Further, because the thickness of the fluid film can be increased in a balanced manner, the risk of contact between the inner peripheral surface of the floating ring 5 and the outer peripheral surface of the rotating shaft 3 can be reduced.

Figure 8:
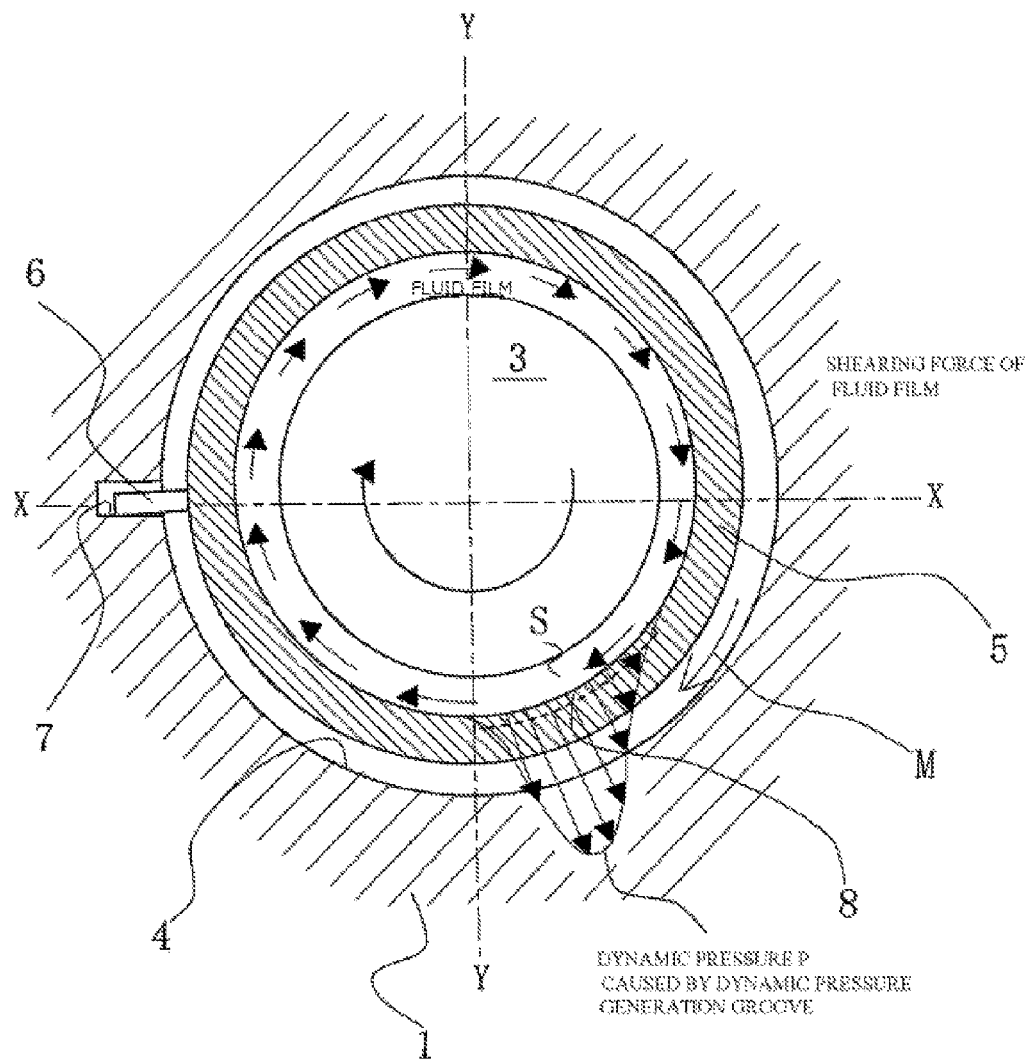
FIG. 8. is a side view schematically illustrating the sealing device according to another embodiment of the present invention, and illustrates a state where the rotating shaft has reached a predetermined rotational speed.

In contrast to the illustration in FIG. 3, the turn-stopping means 6 is provided to positions within the second quadrant and a third quadrant and the groove 8 for generating dynamic pressure is provided to a position in a fourth quadrant, or to positions in the third quadrant and the fourth quadrant, of the inner peripheral surface of the floating ring 5, when the direction of rotation of the rotating shaft 3 is in a counterclockwise direction, in a coordinate system in which the origin of the X-Y coordinate axes is placed at the center of the rotating shaft 3 when the rotating shaft 3 is seen from one side, in a case where there exists a relationship such that the weight of the floating ring is less than the force for lifting up the floating ring by the wedging effect between the rotating shaft and the floating ring (as illustrated in FIG. 8).

In such a case, where the weight of the floating ring 5 is W, the force lifting up the floating ring 5 by the wedging effect in the gap S between the rotating shaft 3 and the floating ring 5 is F1, the force lifting up the floating ring 5 by the dynamic pressure p generated in the dynamic pressure groove 8 is F2, and the distance in the X direction from the turn-stopping pin 6 at each of the points of action is L1, L2, and L3, respectively. In this case, the center of the floating ring 5 and the center of the rotating shaft 3 are matched together, as illustrated in FIG. 4, when the force F2 imparted by the dynamic pressure p generated in the dynamic pressure groove 8 is set such that $W \cdot L1 = F1 \cdot L2 - F2 \cdot L3$.

Figure 5:
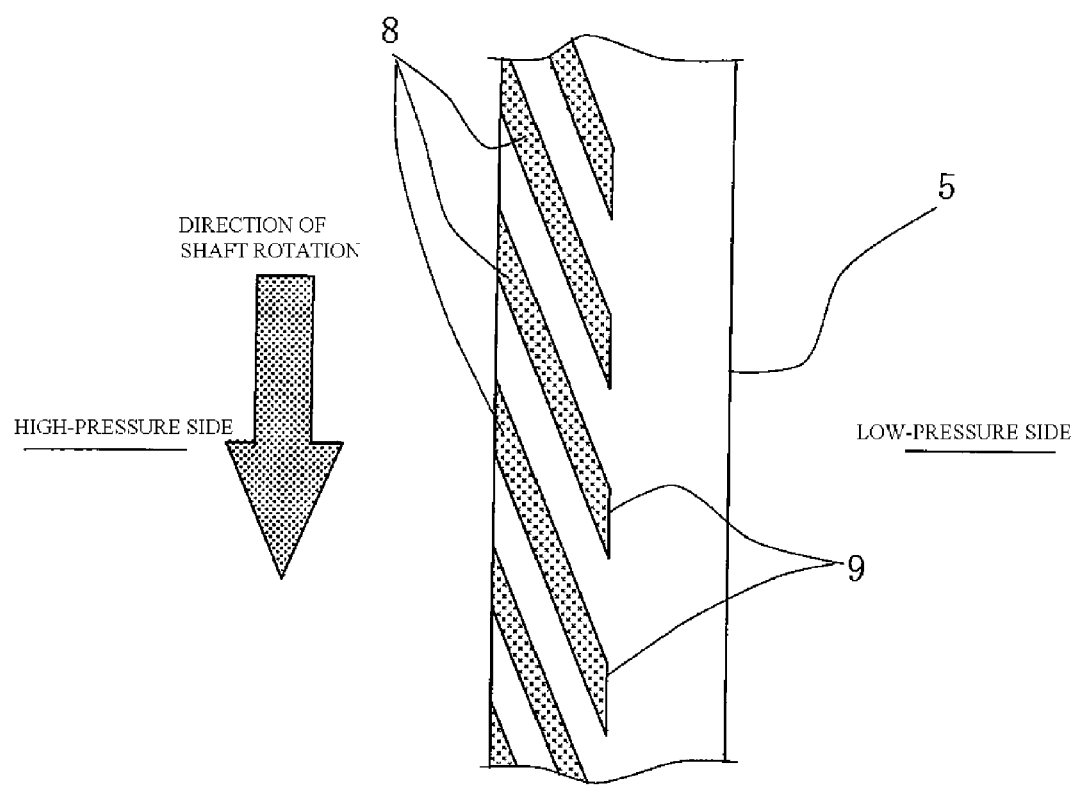
FIG. 5 is a drawing illustrating one example of a dynamic pressure generation groove provided to the inner peripheral surface of the floating ring.
Figure 6:
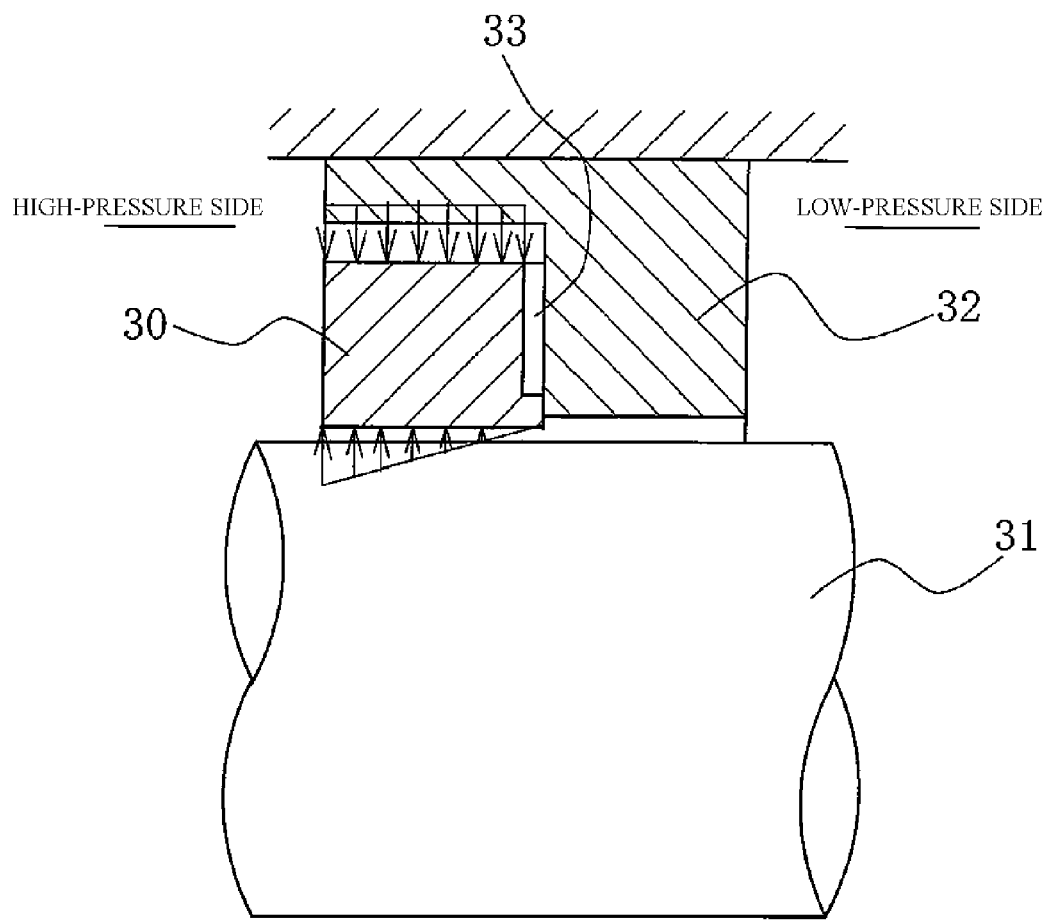
FIG. 6 is a front cross-sectional view illustrating the first prior art.
Figure 7:
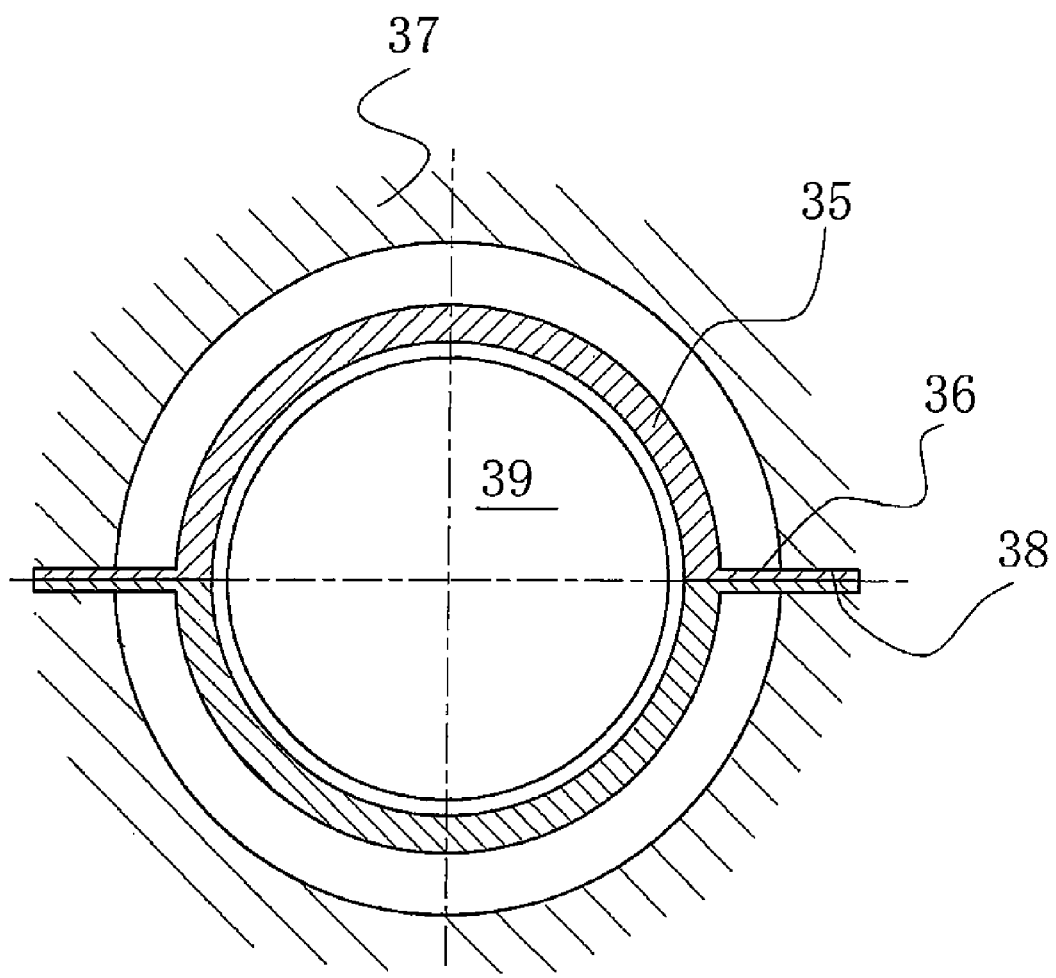
FIG. 7 is a side cross-sectional view illustrating the second prior art.

FIG. 5 illustrates one example of the dynamic pressure generation groove 8 provided locally to the inner peripheral surface of the floating ring 5.

In the present example, the dynamic pressure generation groove 8 is provided to one half of the surface of the high-pressure side so as to have communication with the high-pressure side, makes a shape that is inclined along the direction of rotation of the rotating shaft 3, and becomes increasingly more shallow while progressing to an end part 9.

With the dynamic pressure generation groove 8 having such a configuration, high-pressure fluid can be easily guided into the dynamic pressure generation groove 8, and the dynamic pressure effect can be more reliably brought about.

Claim 2 sets forth that "the turn-stopping means is provided to positions within a second quadrant and a third quadrant and the groove for generating dynamic pressure is provided to a position in a first quadrant, or to positions in a first quadrant and the second quadrant, of the inner peripheral surface of the floating ring, when a direction of rotation of the rotating shaft is in a counterclockwise direction, in a coordinate system in which an origin of X-Y coordinate axes is placed at the center of the rotating shaft when the rotating shaft is seen from one side." However, this is set forth because in a case where the direction of rotation of the rotating shaft is inverse, i.e., when the direction of rotation of the rotating shaft is in the clockwise direction when seen from the same side, then the direction of rotation of the rotating shaft is also in the counterclockwise direction when seen from the other side. As such, claim 2 includes a case where the direction of rotation of the rotating shaft is either of these directions. This holds true for claim 3 in the same manner as claim 2.

REFERENCE SIGNS LIST

1 Casing
2 Hole
3 Rotating shaft
4 Cylindrical space
5 Floating ring
6 Turn-stopping pin
7 Groove
8 Dynamic pressure generation groove
9 End part
δ Gap
S Gap between the rotating shaft and the floating ring
P Dynamic pressure
M Moment of rotation

The invention claimed is:

1. A sealing device provided with a floating ring between an outer periphery of a rotating shaft and an inner periphery of a casing, wherein a turn-stopping means is provided only to a single point defined in a circumferential direction of the floating ring, and grooves for generating dynamic pressure are provided to an inner peripheral surface of the floating ring facing the outer periphery of the rotating shaft, wherein all the grooves for generating dynamic pressure are open to the outer periphery of the rotating shaft and are closed to the inner periphery of the casing, and are provided on the inner peripheral surface of the floating ring only in a first quadrant or only in the first quadrant and a second quadrant of the inner peripheral surface of the floating ring in a coordinate system as viewed in an axial direction of the rotating shaft where an origin is placed at a center of the rotating shaft and the turn-stopping means is on a left side such as to generate force for moving the floating ring upward as a whole when in use wherein downward force by gravity is exerted on the floating ring.

2. The sealing device according to claim 1, wherein the turn-stopping means is provided to a position within an area from the second quadrant to the third quadrant and the grooves for generating dynamic pressure are provided to a position only in the first quadrant, or to positions only in the first quadrant and the second quadrant, of the inner peripheral surface of the floating ring, when a direction of rotation of the rotating shaft is in a counterclockwise direction, in the coordinate system in which the origin is an origin of X-Y coordinate axes placed at the center of the rotating shaft when the rotating shaft is seen from one side, the counterclockwise direction is defined as viewed from the one side, and upper right, upper left, lower left, and lower right quadrants as viewed from the one side are defined as the first, second, third, and fourth quadrants, respectively, in a case where there exists a relationship such that the weight of the floating ring is greater than the force for lifting up the floating ring by the wedging effect between the rotating shaft and the floating ring.

3. A sealing device provided with a floating ring between an outer periphery of a rotating shaft and an inner periphery of a casing, wherein a turn-stopping means is provided only to a single point defined in a circumferential direction of the floating ring, and grooves for generating dynamic pressure are provided to an inner peripheral surface of the floating ring facing the outer periphery of the rotating shaft, wherein all the grooves for generating dynamic pressure are open to the outer periphery of the rotating shaft and are closed to the inner periphery of the casing, and are provided on the inner peripheral surface of the floating ring only in a fourth quadrant or only in the fourth quadrant and a third quadrant of the inner peripheral surface of the floating ring in a coordinate system as viewed in an axial direction of the rotating shaft where an origin is placed at a center of the rotating shaft and the turn-stopping means is on a left side such as to generate force for moving the floating ring downward as a whole when in use wherein downward force by gravity is exerted on the floating ring, which force is less than force by the wedging effect between the rotating shaft and the floating ring at a predetermined rotational speed of the rotating shaft.

4. The sealing device according to claim 3, wherein the turn-stopping means is provided to a position within an area from a second quadrant to a third quadrant and the grooves for generating dynamic pressure are provided to a position only in the fourth quadrant, or to positions only in the third quadrant and the fourth quadrant, of the inner peripheral surface of the floating ring, when a direction of rotation of the rotating shaft is in a counterclockwise direction, in the coordinate system in which the origin is an origin of X-Y coordinate axes placed at the center of the rotating shaft when the rotating shaft is seen from one side, the counterclockwise direction is defined as viewed from the one side, and upper right, upper left, lower left, and lower right quadrants as viewed from the one side are defined as the first, second, third, and fourth quadrants, respectively, in a case where there exists a relationship such that the weight of the floating ring is less than the force for lifting up the floating ring by the wedging effect between the rotating shaft and the floating ring.

* * * * *